Feb. 9, 1971 D. G. HARDING 3,561,809
HIGH TORQUE CARGO HOOK
Filed Dec. 29, 1967

INVENTOR
DAVID G. HARDING

BY Matthew P. Lynch

HIS ATTORNEY.

United States Patent Office 3,561,809
Patented Feb. 9, 1971

3,561,809
HIGH TORQUE CARGO HOOK
David G. Harding, Morton, Pa., assignor to The Boeing Company, Seattle, Wash., a corporation of Delaware
Filed Dec. 29, 1967, Ser. No. 694,673
Int. Cl. B66c *1/00, 1/36*
U.S. Cl. 294—81　　　　　　　　　　　　2 Claims

ABSTRACT OF THE DISCLOSURE

Cargo handling apparatus including a pair of arms having end portions adapted to receive a cargo sling for supporting a suspended load. The arms assume a loading position in which their end portions are disposed adjacent one another for receiving the sling at substantially a single location. After the sling is attached to the end portions, the arms are moved away from each other to provide support for the sling at spaced locations.

---

The present invention relates generally to cargo handling apparatus and specifically to handling apparatus adapted to receive a cargo sling at a single location and to support the sling at spaced locations.

When a load or cargo is to be lifted and transported by an aircraft such as a helicopter, for example, with the load disposed in a suspended position below the aircraft, the load is secured to a hook, which is mounted on the underside of the fuselage of the aircraft, by one or more slings attached to the load. It more than one sling is employed to support the load on the hook, all of the slings are usually connected to a ring, which is coupled to the hook. This results in the load centering itself beneath the aircraft with all of the slings supporting the load.

While this single point load suspension arrangement has been satisfactory in the past when the forward speed of the load-carrying aircraft such as a helicopter, for example, was relatively slow, this arrangement is not satisfactory in present-day cargo transportation because of its limiting effect on the forward speed of an aircraft. For example, it has been determined by testing that an aircraft, which is capable of travelling in forward flight at a speed of 130 knots, cannot safely fly at a forward speed greater than 80 knots when transporting a load such as a howitzer due to aerodynamic instability. Thus, the single-point suspension system prevents the aircraft from being utilized at its full capability whereby transportation of the load or cargo requires a longer period of time than would be necessary if the aircraft could operate at its full capability.

When utilizing a single-point suspension system, aerodynamic forces acting on the suspended load may cause it to yaw or to begin to rotate after the aircraft starts its forward movement with the load suspended therebeneath. The speed of the aircraft relative to the type, size, and weight of the load determines whether there is yaw or rotation. If yawing should occur, then after a certain amount of yawing has occurred, the restraining force of the sling overcomes the aerodynamic forces to cause the load to rotate or yaw in the opposite direction. While this condition is not desirable, it can be tolerated as long as the aircraft is operated at a relatively slow forward speed.

However, if the aircraft operates beyond a certain forward speed, the load begins to "swim" because of the progressively increasing yawing. "Swimming" is a term delineating the oscillating yawing of a load when the forward speed of the transporting aircraft becomes greater than the safe speed for the type, size, and weight of the load being transported. For example, in the aforementioned test, the safe speed is 80 knots for the howitzer. If the aircraft should exceed 80 knots, then the load begins to "swim."

When "swimming" occurs, a plurality of different unsafe conditions can occur due to the creation of a dynamic unbalance in the aircraft. One of these is that the load may strike the aircraft. As a result, the load may be damaged and/or the aircraft may be damaged.

Another is that the load may autorotate so as to cause the sling to wind up and chafe. When theis occurs, the sling may become sufficiently worn to break, causing the load to fall.

Another unsafe condition produced by "swimming" is that the hook, the ring, and the slings are quite often stressed beyond their safe-load limits. As a result, they tend to weaken and break so as to cause the load to fall.

In order to control the yawing of a suspended load and still be able to operate an aircraft to its full capability so that it may fly at its desired forward speed without being limited due to the load, multi-point suspension systems have been developed in which the load is supported at more than one point at the upper end of its support slings. By supporting the load from a number of spaced points, a sufficient restraining torque is applied to the load to decrease the tendency of the load to yaw in forward flight without any tendency of the load to "swim."

While the multi-point suspension systems tend to eliminate the yaw and rotation produced by a load suspended from a single point so as to permit full capability of the forward speed of the aircraft to be utilized, the multi-point suspension systems produce other problems. One of these resides in the necessity for coupling and uncoupling the load slings to a plurality of hooks which are utilized when a multi-point suspension system is employed and for which additional personnel are required. Thus, in order to not lose the time gained from the aircraft being capable of flying at a greater forward speed, it is necessary to employ additional personnel to connect the load to the multi-point suspension system.

This fast loading and unloading is particularly important when operating in war zones where it is desired for the aircraft to be subjected to enemy fire for as short a period of time as possible. This requirement of several personnel to connect and disconnect the hooks to the slings also exposes more personnel to enemy fire.

Another problem is that the increased number of rings and hooks increases the possibility of one of the rings and one of the hooks not being securely coupled to each other. If all of the rings are not securely connected to all of the hooks of the multi-point suspension system, the load will shift when the aircraft rises. As a result, the load may become damaged due to shifting. This shifting of the load also may produce an upsetting moment on the aircraft and cause a crash. The shifting of the load also may result in the load slings becoming over stressed and possibly failing to cause the load to fall.

Thus, while the multi-point suspension systems permit the utilization of the full capability of the forward speed of the aircraft in comparison with the single point suspension system, the multi-point suspension system has other problems. These tend to limit utilization of the multi-point suspension system.

The present invention satisfactorily overcomes the foregoing problems of both the single-point suspension system and the multipoint suspension system. Thus, the cargo hook of the present invention utilizes only a single point of original attachment to the sling or slings connected to the load. Accordingly, only one connection needs to be checked to insure that there is a secure coupling between the hook of the present invention and the support slings or cables of the load. The present invention eliminates the "swimming" problem of the single-point suspension system by automatically being converted to a multi-point suspension system before forward flight begins. As a result, the cargo hook of the present invention permits the load to be suspended from spaced points during transporting thereof so as to permit safe transportation of the load in forward flight at the full operating speed of the aircraft while preventing the load from yawing or rotating.

An object of this invention is to provide an improved multipoint suspension apparatus for transporting cargo.

Another object of the invention is to provide cargo-handling apparatus to receive a cargo sling at a single location for loading and movable to an operating position for suspending the sling at spaced locations.

Still another object of this invention is to provide a cargo hook that substantially eliminates yawing and rotation of a load suspended from an aircraft during forward flight of the aircraft.

A further object of this invention is to provide a multipoint suspension apparatus for a cargo wherein the cargo-supported slings are quickly and easily connected to and disconnected from a single point of the multi-point suspension apparatus.

Other objects of this invention will be readily perceived from the following description, claims, and drawings.

This invention relates to a cargo hook comprising a support and a pair of arms mounted thereon for movement relative thereto. The arms are adapted to be disposed in a position with one end of each of the arms adjacent each other for receiving in the adjacent ends of the arms at least one sling attached to the load. An operating mechanism is provided to move the arms relative to the support whereby the adjacent ends are spaced from each other for support of the sling at two spaced locations.

This invention also relates to a load suspension apparatus comprising a grappling mechanism adapted to receive at a single location at least one sling attached to a load to be supported by the apparatus. The grappling mechanism comprises two members movable relative to each other and an actuating mechanism to move the two members away from each other to support each sling at spaced locations on the sling to provide a multi-point suspension system for the load.

This invention further relates to a method of suspending a load from an aircraft or the like for transporting the load by the aircraft. The method comprises the steps of attaching at least one sling connected to the load to a single location of a suspension system supported by the aircraft and supporting each of the slings at spaced locations after the sling is connected to the suspension system before the load is transported. The method also comprises returning the support of each sling to the single location after the load has been transported, and then disconnecting each sling from the single location of the suspension system.

The attached drawing illustrates preferred embodiments of the invention, in which.

Figure 1:
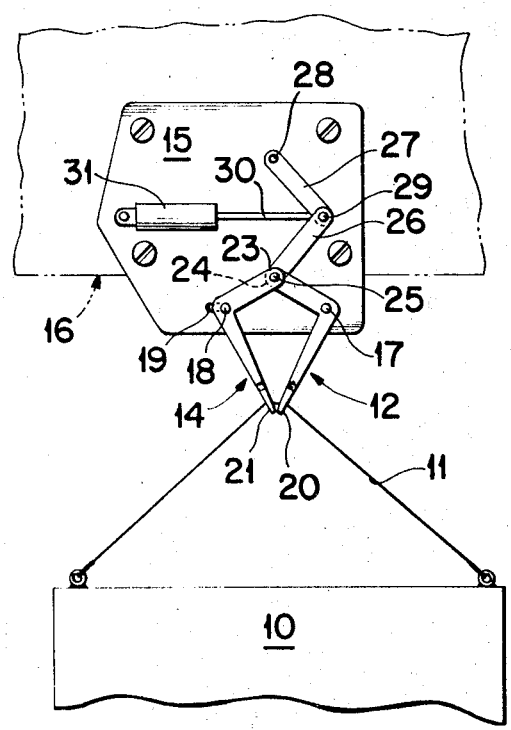
FIG. 1 is a side elevational view of cargo-handling apparatus embodying the present invention illustrated in its single location attachment position.

Referring to the drawings, and particularly to FIG. 1, there is shown a load or cargo 10 that is adapted to be supported in suspended relation to an aircraft such as a helicopter. The load 10 has a sling or cable 11 attached thereto to permit the load to be retained in suspended relationship to the aircraft by the cargo hook of the present invention. While only one of the slings 11 has been shown, it should be understood that any suitable number of the slings 11 may be employed if desired. This would be determined by the size, weight, and type of load.

The cargo hook of the present invention includes a pair of support arms 12 and 14, which are mounted on a support member 15 for movement relative thereto. The support member 15 is fixedly secured to a portion 16 of the aircraft.

The support arm 12, which is a bellcrank, is pivotally mounted intermediate its ends on the support member 15 by a pin 17. The support arm 14, which also is a bellcrank, has a pin 18 secured thereto intermediate its ends and disposed within a slot 19 in the support member 15. Thus, the support arm 14 is mounted for both pivoting and sliding movement relative to the support member 15.

As shown in FIG. 1, the support arm 12 has its lower end 20 disposed adjacent lower end 21 of the support arm 14 when the sling 11 is to be attached thereto. This forms a single point receiving means for the sling 11.

Figure 3:
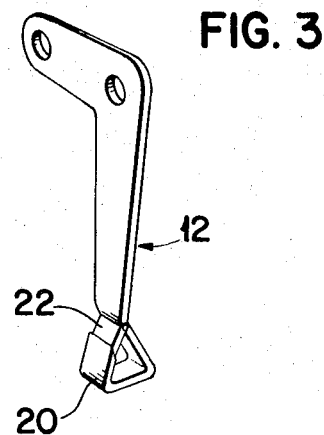
FIG. 3 is a perspective view of one of the support arms of the apparatus of FIGS. 1 and 2.

As shown in FIG. 3, the arm 12 has the hook end 20 formed with a spring-biased catch 22 adapted to receive the sling 11 therein. The hook end 21 of the support arm 14 has a similar catch. Accordingly, the sling 11 may be easily connected to the ends 20 and 21 of the support arms 12 and 14, respectively, and the sling is retained within the ends 20 and 21 by the catches 22 during flight.

The arm 12 has its upper end 23 overlapped by an upper end 24 of the support arm 14. The upper ends 23 and 24 are pivotally connected to each other by a pin 25, which also pivotally connects the lower end of a toggle link 26 to the arms 12 and 14. Thus, any movement of the toggle link 26 is transmitted to the arms 12 and 14.

The toggle link 26 is part of a toggle mechanism that includes a second toggle link 27. The upper end of the toggle link 27 is pivotally connected to the support member 15 by a pin 28 while its lower end is pivotally connected by a pin 29 to the toggle link 26. The pin 29 also is secured to one end of an actuating rod 30 for moving the toggle links 26 and 27 whereby movement of the support arms 12 and 14 is produced.

The actuating rod 30 extends into an actuating cylinder 31, which is pivotally connected to the support member 15. The actuating rod 30 is responsive to energization of the cylinder 31 for sliding movement relative to the cylinder 31.

Figure 2:
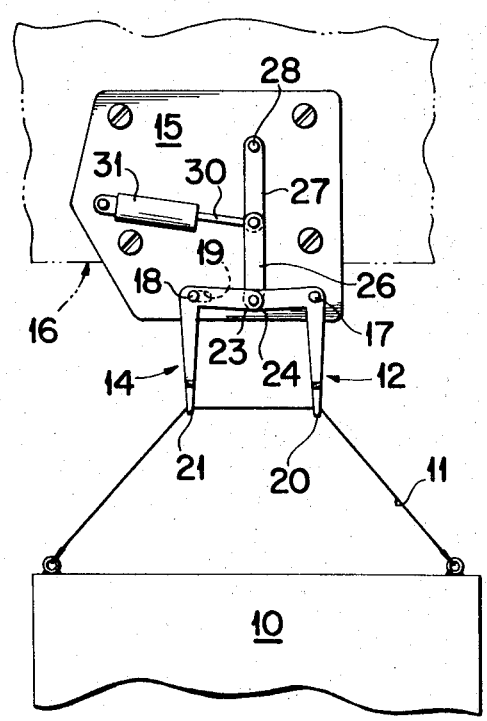
FIG. 2 is a side elevational view, similar to FIG. 1, but showing the apparatus in its multi-location suspension position to permit transporting of the load.

When the rod 30 is retracted into the cylinder 31, the toggle links 26 and 27 are pivoted to an overcenter position as shown in FIG. 2. When this occurs, the adjacent lower ends 20 and 21 of the support arms 12 and 14 are moved away from each other to provide support to the sling 11 at spaced locations thereon as shown in FIG. 2. Thus, a multi-location suspension system is provided for the load 10 when the rod 30 is retracted into the cylinder 31.

Considering the operation of the present invention, the aircraft is positioned so that the sling 11 may be disposed within the hook ends 20 and 21 of the support arms 12 and 14. With a helicopter, this connection may be made while the helicopter is in hover so that only a short period of time is required to quickly and rapidly connect the load 10 to the aircraft when the present invention is used.

With the helicopter still in hover, the cylinder 31 is energized to retract the rod 30 into the cylinder 31. As a result, the toggle links 26 and 27 are moved to the overcenter position of FIG. 2. The movement of the toggle link 26 from the position of FIG. 1 to the position of FIG. 2 results in the support arm 12 pivoting counterclockwise about the pin 17. The support arm 14 not only pivots clockwise about the pin 18, but also slides relative to the support member 15 due to the pin 18 sliding in the slot 19. It should be understood that the axis of the slot 19 is disposed substantially parallel to the plane of the desired movement of the support arm 14.

With the toggle links 26 and 27 in their overcenter position, the support arms 12 and 14 are locked in the position shown in FIG. 2. In this position, two spaced points of support are provided for the sling 11 of the load 10. As a result, a multilocation suspension system is provided by the cargo hook of the present invention for the load 10.

Then, the helicopter lifts the load 10 and transports it to the desired area. When the helicopter reaches the desired area, it descends until the load 10 is supported on the ground. At this time, the cylinder 31 is deenergized to extend the rod 30 from the position of FIG. 2 to the position of FIG. 1. At this time, the arms 12 and 14 are returned to the postion of FIG. 1 in which their lower ends 20 and 21 are adjacent to each other to form a single point of attachment for the sling 11.

It is then only necessary to remove the sling 11 from the single point of attachment to the arms 12 and 14. This may be accomplished rather quickly by one person and the helicopter quickly relieved of its load. This is particularly important when using the helicopter for transporting suspended loads in war zones where the helicopter may be subjected to ground fire.

Figure 4:
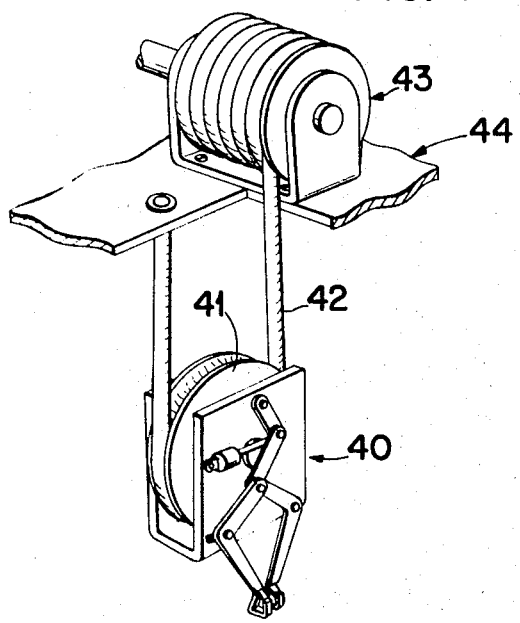
FIG. 4 is a side elevational view of another embodiment of the present invention.

Referring to FIG. 4, there is shown another form of supporting the cargo hook of the present invention. In this form, the support member 15 is replaced by a U-shaped support member 40. The support member 40 rotatably mounts a pulley 41 between its legs or sides.

The support member 40 is supported from an aircraft by a cable 42, which passes around the pulley 41. One end of the cable 42 is fixedly secured to the aircraft while the other end of the cable 42 is wound upon a drum 43. The drum 43 is rotatably mounted within the aircraft on a portion 44 and adapted to be driven by suitable motive means in the aircraft for raising and lowering the support member 40.

Thus, the load 10 may be suspended at a greater distnce from the aircraft if desired. Furthermore, it is not necessary for the aircraft such as a helicopter, for example, to be disposed as close to the ground with the modification of FIG. 4 as with the embodiment of FIGS. 1 and 2 for picking up or delivering the load 10. This is particularly desirable in war zones.

While the catch 22 on each of the support arms has been shown as a spring-biased member, which is manually operable, it should be understood that automatic means could be employed if desired. For example, each of the arms 12 and 14 could have a lower portion pivotally mounted on the remainder of the arm and movable by an actuator. The lower portion would then be movable automatically from an open to closed position and vice versa.

An advantage of this invention is that it provides a high retaining torque to the load or cargo without requiring a fixed multi-point suspension system. Another advantage of this invention is that it reduces the loading and unloading time of a load that is restrained against yaw and rotation when the transporting aircraft is in flight. A further advantage of this invention is that it quickly and rapidly converts from a single point attachment system to a multi-point suspension system and vice versa.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. Cargo handling apparatus comprising: a support having a slot therein, a pair of bellcranks including first parts adapted to receive a load and second parts remote from said first parts, first means pivotally mounting one of said bellcranks on said support for rotation about a fixed center, second means pivotally mounting the other of said bellcranks about a center freely movable within said slot, a toggle mechanism having a first link pivotally connected at one end to said second parts and a second link pivotally connected at one end to said support, the other ends of said first and second links being pivotally connected to each other, and an actuating mechanism pivotally connected to said support and to said links at their connected ends for moving said bellcranks from a loading position in which said first parts are adjacent one another to an operating position whereby said one bellcrank pivots relative to said support and said other bellcrank both pivots and slides along said slot relative to said support so that said first parts are disposed at spaced locations.

2. Apparatus as set forth in claim 1 in which said actuating mechanism includes a cylinder pivotally connected to said support and an actuating rod pivotally connected to said links at their connected ends.

References Cited

UNITED STATES PATENTS

| 1,569,918 | 1/1926 | Flynn | 294—97 |
| 2,928,558 | 3/1960 | Bamford et al. | 187—8.72X |
| 3,010,751 | 11/1961 | Day et al. | 294—81 |
| 3,044,818 | 7/1962 | Tobey | 294—81 |
| 3,228,659 | 1/1966 | Horst-Ernst Sturm | 187—8.72 |
| 3,337,256 | 8/1967 | Shropshire | 294—78 |

EVON C. BLUNK, Primary Examiner

R. S. GAITHER, Assistant Examiner

U.S. Cl. X.R.

294—82, 85